Figure 1:
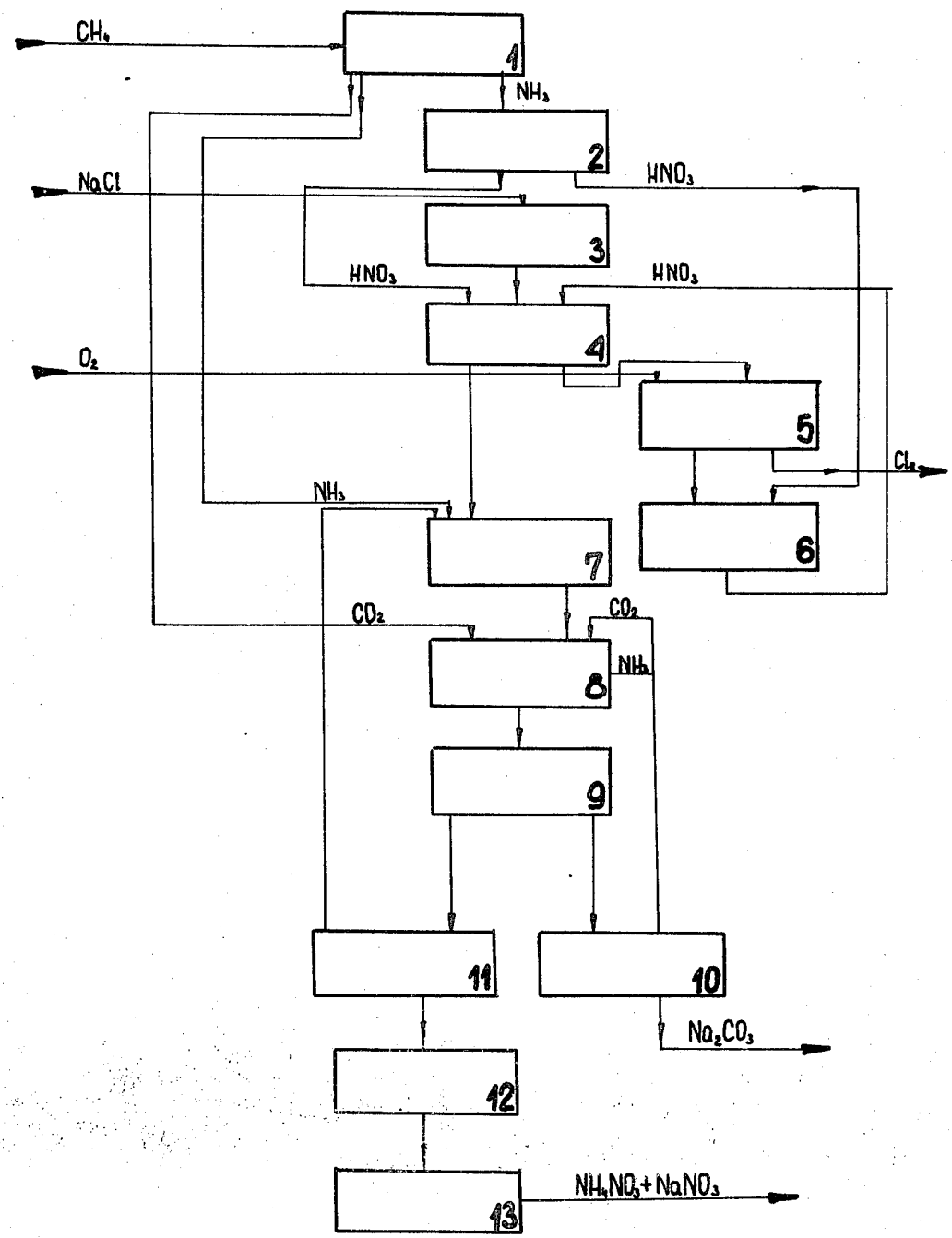

United States Patent [19]
Pischinger et al.

[11] 3,734,709
[45] May 22, 1973

[54] PROCESS FOR THE PRODUCTION OF CHLORINE, SODIUM BICARBONATE AND AMMONIUM-SODIUM NITRATE

[76] Inventors: Ernest Pischinger, Konopnickiej 21a, Torun; Stanislaw Bursa, Malczwskiego 19/5, Szczecin; Henryk Koneczny, Krasinskiego 57/9, Torun; Jerzy Straszko, Ksieciz, Witolda 1a/10, Szczecin, all of Poland

[22] Filed: Oct. 22, 1971

[21] Appl. No.: 191,822

Related U.S. Application Data

[63] Continuation-in-part of Ser. No. 808,062, March 18, 1969, abandoned.

[52] U.S. Cl. ..................71/59, 423/241, 423/399, 423/423, 423/424
[51] Int. Cl. ............................................C05c 13/00
[58] Field of Search .................71/59; 423/240, 241, 423/399, 472, 504, 423, 424

[56] References Cited
UNITED STATES PATENTS

| | | |
|---|---|---|
| 3,062,616 | 11/1962 | Chadwick..........................23/102 A |
| 1,081,107 | 12/1913 | Freeth et al. ..........................23/103 |
| 2,269,000 | 1/1942 | Beekhuis..........................23/102 A |
| 3,214,240 | 10/1965 | Beekhuis..........................23/102 A |

*Primary Examiner*—Samih N. Zaharna
*Assistant Examiner*—Richard Barnes
*Attorney*—Irvin A. Lavine

[57] ABSTRACT

A combined process for producing chlorine, sodium bicarbonate and ammonium-sodium nitrate comprising oxidizing sodium chloride with nitric acid solution to form with unreacted nitric acid, sodium nitrate solution and gaseous reaction products including chloride, nitrogen oxide and nitrosyl chloride; oxidizing chlorine compound in said gaseous mixture to chlorine and removing chlorine by liquefaction and distillation or by absorption with solvent; absorbing nitrogen oxides in said gaseous reaction products into nitric acid, neutralizing the solution mixture of sodium nitrate and nitric acid by ammoniation and carbonizing the neutralized product to precipitate sodium carbonate and leave a solution of ammonium-sodium nitrate.

5 Claims, 1 Drawing Figure

PROCESS FOR THE PRODUCTION OF CHLORINE, SODIUM BICARBONATE AND AMMONIUM-SODIUM NITRATE

This application is a Continuation-In-Part of Ser. No. 808,062, filed Mar. 18, 1969 and now abandoned.

The invention relates to the combined process for the production of chlorine, sodium bicarbonate and a concentrated fertilizer in the form of mixtures of ammonium and sodium nitrates. The present production process, in which chlorine, sodium bicarbonate and ammonium-sodium nitrate are obtained as final products is unknown in the technical and patent literature and are not hitherto used in industrial practice.

The known processes for the production of chlorine and sodium bicarbonate have several imperfections.

The known oxidation processes of alkali metal chlorides e.g. oxidation of sodium chloride with nitric acid (U.S. Pats. No. 3,062,616, 3,062,617, 3,062,618) and of potassium chloride (U.S. Pat. No. 3,211,525) as well as oxidation of alkali metal chlorides with nitrogen oxides (Fr. Pat. No. 1,333,769 and W. German Pat. No. 1,068,676) result in obtaining chlorine and sodium or potassium nitrate. Oxidation of sodium chloride results in sodium nitrate, containing the sodium ion and is useless for plants.

Other processes for the production of chlorine e.g. by electrolysis of potassium or sodium chlorides yield also hydroxides of these metals which are by-products of limited demand.

In the known Solvay process for the production of sodium bicarbonate and sodium carbonate by carbonation of ammoniated sodium chloride solution burdensome wastes, mainly in the form of calcium chloride are obtained.

In this Solvay process the chloride ion is not thoroughly utilized and it should be additionally bonded by means of calcium from ammonium chloride in the ammonia regeneration process and removed to waste ponds.

In all these processes mentioned above burdensome wastes and unprofitable by-products are obtained in addition to the final products or the raw materials are not fully utilized.

The process according to the invention is devoid of disadvantages mentioned above. In the present process the solution of sodium nitrate and nitric acid is neutralized, saturated with ammonia and carbonated with carbon dioxide.

By this reaction sodium bicarbonate precipitates from the solution and may be further processed into sodium carbonate in known manner. Ammonium nitrate and unreacted sodium nitrate contained in the solution may be isolated by evaporation, crystallization, centrifuging and drying the obtained nitrate (crystals).

The operations of neutralization and ammoniation of the solution of sodium nitrate and nitric acid as well as further carbonation of the resulting solution with carbon dioxide are carried out to such a stage as to obtain ammonium-sodium nitrate, containing not less than 70 percent by weight of ammonium nitrate and above 30 percent of the total content of nitrogen in a reaction vessel.

In the oxidation of sodium chloride, nitric acid is employed in excess. The nitric acid is preferably at about 60 percent to about 70 percent concentration for reaction with sodium chloride, while leaving an excess to be ultimately neutralized to provide a sodium-ammonium nitrate solution which is at least about 70 percent by weight ammonium nitrate. A small amount of 90 percent nitric acid is preferably present to oxidize nitrosyl chloride to chlorine. Large excesses of nitric acid are not employed.

The post-reaction solution of oxidation of sodium chloride with an excess of concentrated nitric acid is passed into a sieve plate column. The post-reaction gaseous mixture contains gaseous reaction products including nitrogen oxides, nitrosyl chloride and chlorine. The gaseous mixture is partially recycled into the reaction vessel into a separate absorption column wherein nitrosyl chloride is removed from the other gases by oxidation and absorption with a portion of the excess nitric acid and dried by cold treatment. The remaining gas mixture is separated by means of rectification into nitrogen oxides and chlorine, a final product. The nitrogen oxides are oxidized with cold concentrated nitric acid to form principally nitrogen tetroxide and are then oxidized into additional nitric acid by known methods. Chloride ion is substantially completely removed in the foregoing procedure by passing nitrogen oxides through the solution.

The process according to the invention can be combined with the production of ammonia which is partly utilized for neutralization and ammoniation of the solution of sodium nitrate and nitric acid and partly for the production of nitric acid, which is subsequently utilized in oxidation of sodium chloride.

Carbon dioxide, formed in the ammonia production, is utilized in carbonation of the ammonia solution containing ammonium and sodium nitrates.

In the instant invention sodium bicarbonate is formed to leave a mixture of ammonium and sodium nitrates in solution. Solutions of these nitrates can be concentrated and used as liquid mixed fertilizers, or can be evaporated to obtain the solid mixed nitrate, which can be used as a solid mixed fertilizer.

The outstanding advantages of the combined process for the production of sodium carbonate chlorine and ammonium-sodium nitrate as compared to other processes previously known and used are as follows: utilization of all elements contained in raw-materials; great simplification of technological system; the possibility of utilization of carbon dioxide which has usually been regarded as a waste in the ammonia production. Moreover several operations connected with the utilization or removal of wastes can be avoided, since there are in practice no wastes in this process.

The initial concentrations of each of the ammonium and sodium nitrates can be controlled by concentrating the mother liquor until it contains about 30 percent of the total content of nitrogen. In this way crystallization of only ammonium nitrate is avoided.

In the process of the instant invention chlorine is formed without undesirable side production of soda lye which often occurs in the electrolysis of sodium chloride. Further, sodium bicarbonate (and, if desired, sodium carbonate) is formed without distillation residues since there is no ammonia regeneration from the stage at which sodium bicarbonate is formed. Ammonia regeneration is not necessary since in the initial stages of the reaction nitrate ion replaces chloride ion. Thus, when sodium bicarbonate is formed ammonium nitrate (and not ammonium chloride) is also formed. This, in mixture with sodium nitrate can be readily separated from the post-reaction liquor. Consequently, the distillation of ammonia, with the accompanying formation of wastes, which latter is characteristic of the Solvay process, is not required.

In the instant invention the mixture of ammonium and sodium nitrates and an optimal amount of sodium bicarbonate are obtained in quantities which are conditioned by the respective concentration of the starting materials. Further, filtration of the mother liquor is desirably practiced at about 28° – 30° C in order to effect separation of sodium bicarbonate.

Thus ammonium-sodium nitrate mixture is obtained by concentrating solutions of these nitrates of the respective boiling temperatures of these solutions and, if desired, under respective pressures to effect evaporation in a multiple-effect evaporator.

The solution obtained after oxidation of sodium chloride with nitric acid to form a solution including excess nitric acid, sodium nitrate and a gaseous mixture from which chlorine is removed and nitrogen oxides are oxidized to additional nitric acid, which is typically at about 63 percent to about 98 percent concentration and which can be used to aid in the oxidation of sodium chloride and of nitrosyl chloride gaseous reaction product typically has the following weight concentrations prior to formation of sodium bicarbonate.

| | |
|---|---|
| Sodium Nitrate | 68.0 parts |
| Ammonium Bicarbonate | 49.6 parts |
| Water | 100.0 parts |
| Ammonium Nitrate | 16.0 parts |

These amounts will make the optimal efficiency of sodium bicarbonate, which is separated as large, well shaped crystals, and thus a respective ratio of ammonium nitrate to sodium nitrate in solution.

The amounts indicated above influence the amount of nitric acids to be used in excess of the amount required to oxidize sodium chloride while providing substantially total oxidation of the chloride ion.

The process according to the invention for the production of sodium carbonate, chlorine and ammonium-sodium nitrate is illustrated in the FIGURE in which the particular operation stages of the process are marked.

The first stage of this combined process in the production of ammonia by one of several known methods, e.g. by the conversion of methane 1. Ammonia is being used as a starting material for producing nitric acid by oxidation 2 and also for neutralization 7 and ammoniation of the post-reaction solution. Carbon dioxide obtained in the ammonia production stage is subsequently utilized to the carbonization stage 8. The solid sodium chloride, obtained after purification 3 is directed to the oxidation stage 4 with nitric acid.

The gas mixture which is to be rectified in stages, and results from the oxidation stage, contains mainly chlorine, nitrogen oxides and nitrosyl chloride. Chlorine compounds are removed from this gas mixture by oxidation in order to obtain gaseous chlorine and its absorption by means of excess nitric acid, after stage 5.

The vapors of acids and water are removed from these gases by cold treatment. The liquid products of sodium chloride oxidation contain mainly sodium nitrate, unreacted nitric acid and some amounts of chlorides, the last being removed by passing nitrogen oxides through this solution.

Gaseous reaction products evolving from oxidation of chloride ion and nitrosyl chloride, containing chlorine and nitrogen oxides are directed to rectification stage 5, wherefrom chlorine is withdrawn and collected as the final product, while nitrogen oxides are absorbed 6 into additional nitric acid. The nitric acid typically is of about 63 percent to about 98 percent concentration and assists in the oxidation of sodium chloride and nitrosyl chloride.

The post-reaction solution, including sodium nitrate and the excess of nitric acid is neutralized and ammoniated, stage 7. The obtained ammoniated solution of sodium and ammonium nitrates is carbonized, stage 8, by means of carbon dioxide obtained from the ammonia synthesis stage 1 and calcination stage 10. Sodium bicarbonate, formed in the carbonization stage 8 is separated from the solution by filtration 9 and calcinated 10 to sodium carbonate. Either sodium bicarbonate or sodium carbonate is collected as a final product and carbon dioxide is directed to decarbonization 11 where residual amounts of carbon dioxide and ammonia evolve.

The evolved gases are directed to the neutralization and absorption 7, while the decarbonized solution is concentrated 12 and crystallized 13 yielding the final product in form of ammonium-sodium nitrate.

EXAMPLE

All parts and percentages are indicated by weight.

A tank reactor at a temperature of 106° C was filled with 495 parts of evaporated salt containing 467 parts of NaCl and 28.5 parts $H_2O$. Nitric acid in an amount of 1,270 parts of 60 percent nitric acid and 11.5 parts of 98 percent nitric acid was introduced into a column. The acid from the column at a temperature of 80° C passed to the reactor, in which NaCl was oxidized. The amounts of $HNO_3$ and NaCl employed corresponded to a mol ratio of $NaCl/HNO_3$ of about 2:24:1.

The solution from the reactor, wherein the NaCl is not completely oxidized, was directed toward a sieve plate column at about 110° C. $NO_2$ was then introduced into this column to take off 283 parts of chlorine, which included chlorine oxidized from nitrosyl chloride with the 63 percent to 98 percent nitric acid. Remaining gaseous reaction products are oxidized to nitric acid and the after-reaction solution amounted to 1,765 parts containing 680 parts $NaNO_3$, 1,000 parts $H_2O$ and 126 parts $HNO_3$. The mol ratio $HNO_3$/mol $HNO_3 + _{mol\ NaNO3}$ in the reaction mixture was 0.2:1.

This mixture was neutralized by means of gaseous ammonia (condensed ammonia may also by used) in an amount of ammonia in order to obtain a mol ratio of $NH_3/NaNO_3$ equal to 1:1.

The ammoniated brine which was obtained at a temperature of 40° C has the following composition:

| | |
|---|---|
| $NaNO_3$ | 680 parts |
| $NH_4NO_3$ | 160 parts |
| $NH_3$ | 136 parts |
| $H_2O$ | 1,000 parts |

This solution was carbonated at a temperature of 30° C, to obtain a solution with suspended $NaHCO_3$. The output of the carbonizing process in the carbonating column was 67 percent theoretical, amounting to 450 parts of $NaHCO_3$.

The solution was suspended $NaHCO_3$ which was at a temperature of 30° C was directed towards a rotary filter. The $NaHCO_3$ was precipitated by being washed out with 130 parts of $H_2O$. The $NaHCO_3$ which precipitated and which could be calcined contained:

450 parts NaHCO₃  1.4 parts NaNO₃  73 parts N₂O.

The soda obtained subsequent to calcination had the following composition:

| | |
|---|---|
| Na₂CO₃ | 280 parts |
| NaNO₃ | 1.4 parts |
| H₂O | 1.4 parts |

The filtrate liquor which was at a temperature of 30° C and contained:

| | |
|---|---|
| NaNO₃ | 233 parts |
| NH₄NO₃ | 583 parts |
| NH₄HCO₃ | 110 parts |
| (NH₄)₂CO₃ | 42 parts |
| H₂O | 931 parts | was decarbonized in order to decompose the ammonia-carbonate salts and partially evaporate the water, thereby to obtain an equeous solution of NaNO₃ and NH₄NO₃ mixture at a temperature of 85° C which contained:

| | |
|---|---|
| NaNO₃ | 233 parts |
| NH₄NO₃ | 583 parts |
| H₂O | 8.5 parts |

The total percentage of nitrogen contained in such type mixed salpetre is 29.6.

We claim:

1. A combined process for the production of chlorine, sodium-bicarbonate and sodium-ammonium comprising oxidizing sodium-chloride with excess nitric acid to form together with unreacted nitric acid, a solution of sodium nitrate and gaseous reaction products including chlorine, nitrogen oxides and nitrosyl chloride; oxidizing the chloride ion in the post-reaction solution in the presence of NO₂, and removing chlorine from the reaction product; oxidizing the nitrogen oxides in said gaseous mixture to additional nitric acid; neutralizing the unreacted nitric acid, in contact with the sodium nitrate, with ammonia in a mol ratio of ammonia to sodium nitrate of about 1:1; carbonizing the reaction mixture with carbon dioxide to a yield of sodium bicarbonate of about 67 percent of theoretical as a precipitate; separating said sodium bicarbonate from the remaining solution of sodium nitrate and ammonium nitrate and also including ammonium bicarbonate and ammonium carbonate; and decarbonizing said ammonium bicarbonate and said ammonium carbonate and partially evaporating said solution at about 85° C to obtain a solution of sodium-ammonium nitrate which is about 70 percent ammonium nitrate and has a total nitrogen content of about 30 percent.

2. The process as claimed in claim 1, wherein said sodium bicarbonate is precipitated in large crystals.

3. The process as claimed in claim 2, wherein said sodium bicarbonate is calcined to form sodium carbonate.

4. The process of claim 1 wherein said nitric acid which oxidizes sodium chloride is about 60 percent – 70 percent concentrated and said nitric acid formed by oxidation of said nitrogen oxide is about 63 percent to 98 percent concentrated.

5. The process of claim 1 wherein the mol ratio of nitric acid to sodium chloride is about 2.24:1.

* * * * *